US011015632B2

(12) United States Patent
De Jong (10) Patent No.: US 11,015,632 B2
(45) Date of Patent: May 25, 2021

(54) FIXING ELEMENT FOR SECURING A RETAINING ELEMENT ON A SUPPORT AND SYSTEM COMPRISING A FIXING ELEMENT AND A RETAINING ELEMENT

(71) Applicant: A. Raymond et Cie SCS, Grenoble (FR)

(72) Inventor: Michael De Jong, Efringen-Kirchen (DE)

(73) Assignee: A. Raymond et Cie, Grenoble (FR)

(*) Notice: Subject to any disclaimer, the term of this patent is extended or adjusted under 35 U.S.C. 154(b) by 72 days.

(21) Appl. No.: 16/342,134

(22) PCT Filed: Oct. 18, 2017

(86) PCT No.: PCT/EP2017/001225
§ 371 (c)(1),
(2) Date: Jul. 12, 2019

(87) PCT Pub. No.: WO2018/072880
PCT Pub. Date: Apr. 26, 2018

(65) Prior Publication Data
US 2019/0331148 A1 Oct. 31, 2019

(30) Foreign Application Priority Data

Oct. 18, 2016 (DE) .................. 10 2016 012 437

(51) Int. Cl.
*F16B 21/07* (2006.01)
*F16B 2/24* (2006.01)
(Continued)

(52) U.S. Cl.
CPC ............ *F16B 21/075* (2013.01); *F16B 2/243* (2013.01); *F16B 2/245* (2013.01); *F16M 13/02* (2013.01); *B60R 21/20* (2013.01)

(58) Field of Classification Search
CPC ....... F16M 13/02; B60R 21/20; F16B 21/075; F16B 2/243; F16B 2/245
See application file for complete search history.

(56) References Cited

U.S. PATENT DOCUMENTS 5,533,237 A 7/1996 Higgins
6,101,686 A * 8/2000 Velthoven ............... F16B 5/065
24/289

(Continued)

FOREIGN PATENT DOCUMENTS

DE 102009041130 A1 3/2011
EP 0873916 A1 10/1998

(Continued)

OTHER PUBLICATIONS

English translation of International Search Report for International Patent No. PCT/EP2017/001225 dated Feb. 22, 2018, 3 pages.

(Continued)

*Primary Examiner* — Anita M King
(74) *Attorney, Agent, or Firm* — Warner Norcross + Judd LLP (57) ABSTRACT

Disclosed is a fastener for securing a retaining element on a support, wherein the fastener is formed like a retaining clip and has at least one leg and at least one engaging section, wherein the engaging section extends outwardly from the longitudinal axis of the fastener and is designed to engage with the retaining element. The leg has at least one latching section for retaining the retaining element on the support at an opening of the support, wherein the fastener has a channel for a section of the retaining element, wherein the fastener has at least one contact region for the retaining element that is positioned at least partially within the channel, and the contact region is functionally connected to the engaging section via a connecting section, wherein the contact region (Continued)

has an angle greater than 0° and less than 90° to the longitudinal axis of the channel.

11 Claims, 8 Drawing Sheets

(51) Int. Cl.
    *F16M 13/02* (2006.01)
    *B60R 21/20* (2011.01)

(56) References Cited

U.S. PATENT DOCUMENTS

| | | | | |
|---|---|---|---|---|
| 6,145,870 A * | 11/2000 | Devane | ............ | B60R 21/213 280/728.2 |
| 6,353,981 B1 | 3/2002 | Smith | | |
| 6,796,006 B2 * | 9/2004 | Hansen | ............ | F16B 5/065 24/289 |
| 7,188,392 B2 * | 3/2007 | Giugliano | ............ | F16B 5/065 24/295 |
| 7,428,770 B2 * | 9/2008 | Dickenson | ............ | F16B 5/0614 24/289 |
| 7,900,953 B2 * | 3/2011 | Slobodecki | ............ | F16B 21/086 280/728.2 |
| 8,220,827 B2 | 7/2012 | Schirm | | |
| 8,944,733 B2 * | 2/2015 | Podsadny | ............ | F16B 21/07 411/45 |
| 2003/0233738 A1 * | 12/2003 | Osterland | ............ | B60R 13/0206 24/293 |
| 2005/0105987 A1 | 5/2005 | Giugliano et al. | | |
| 2008/0028577 A1 | 2/2008 | Soman et al. | | |
| 2011/0062683 A1 * | 3/2011 | Schirm | ............ | B60R 21/216 280/728.1 |
| 2015/0135487 A1 | 5/2015 | Steltz et al. | | |

FOREIGN PATENT DOCUMENTS

| | | |
|---|---|---|
| JP | H03177607 A | 8/1991 |
| WO | 2002070905 A2 | 9/2002 |

OTHER PUBLICATIONS

Machine assisted translation of JPH03177607A obtained from https://worldwide.espacenet.com on Apr. 15, 2019, 11 pages.

\* cited by examiner

FIXING ELEMENT FOR SECURING A RETAINING ELEMENT ON A SUPPORT AND SYSTEM COMPRISING A FIXING ELEMENT AND A RETAINING ELEMENT

CROSS-REFERENCE TO RELATED APPLICATIONS

This application is the National Stage of International Application No. PCT/EP2017/001225, filed on 18 Oct. 2017, which claims priority to and all advantages of German Patent Application No. 10 2016 012 437.7, filed on 18 Oct. 2016, the content of which is hereby incorporated by reference.

FIELD OF THE INVENTION

The subject invention generally relates to a fastener and, more specifically, to a fastener for securing a retaining element to a support, and to a system comprising such a fastener and a retaining element.

BACKGROUND OF THE INVENTION

A device is known from DE 10 2007 045 296 B3 for fastening two add-on parts to a support part by means of which a "retainer" of an airbag is connected to a support part in the form of a body panel. Given the structure of the device known from DE 10 2007 045 296 B3, a high pull-out force of the retainer relative to the support part is possible, but the desire also exists to provide a way to vary a holding and/or securing force of the retainer relatively to the support part in order to be able to adjust or vary this force more flexibly.

Against this background, the object of the invention was to create a fastener for securing a retaining element to a support whose holding and/or securing force can be more variably adjusted with respect to the retaining element on the support, in order for example to be able to better control a movement of the retaining element with respect to the support and/or satisfy the demands for securing the retaining element.

SUMMARY OF THE INVENTION

The subject invention provides a fastener and system comprising the fastener and a retaining element. Advantageous embodiments are described below.

The fastener includes a channel in which a section of the retaining element can engage, wherein a contact region for contact with the retaining element is at least partially provided in the channel, by which, in addition to an engaging section provided on the fastener, the retaining element can be held. This increases the number of contact regions for the retaining element, in particular independently of possibly available contact regions for the retaining element.

In this case, the increased number of contact possibilities with the retaining element can be used to enable a staggered release of the retaining element from a support. In various embodiments, the retaining element is held by the interaction of the engaging section and the contact region on the one side with at least one, alternatively two latching sections that oppose each other on the inside in the direction of the longitudinal axis of the fastener, on the other side, for example, in that the engaging section interacts with a contact surface of the retaining element whose surface normal has a component that faces toward the longitudinal axis, and the contact region interacts with a latching element whose surface normal has a component that faces in the same direction, whereas the at least one latching section interacts with a surface of the support whose surface normal has a component that faces toward the longitudinal axis but opposite the corresponding component of the surface normal of the contact region and of the latching element. By selecting the orientation and position as well as the material of the contact region and/or by selecting a spring force which preloads the contact region in the direction of a desired position on the one hand, as well as by selecting the orientation and position as well as the material of the latching region and/or by selecting a spring force which preloads the latching region in the direction of a desired position on the other hand, with the invention, one can set whether the force necessary to move the latching element past the contact region in the direction of the longitudinal axis is greater or less than the force necessary to move the latching region past the support in the direction of the longitudinal axis. If the force necessary to move the latching element past the contact region in the direction of the longitudinal axis is greater than the force necessary to move the latching region past the support in the direction of the longitudinal axis, the relative position of the latching region to the support changes when a correspondingly strong force is applied that moves the support away from the retaining element before the fastener changes its relative position to the retaining element. If the force necessary to move the latching element past the contact region in the direction of the longitudinal axis is less than the force necessary to move the latching region past the support in the direction of the longitudinal axis, the relative position of the contact region to the latching element changes first when a correspondingly strong force is applied that moves the support away from the retaining element before the latching region changes its relative position to the support.

The invention creates a fastener for securing a retaining element to a support. The fastener is designed like a retaining clip and has at least one leg and at least one first engaging section. The engaging section extends outwardly from the longitudinal axis of the fastener and is designed to engage with the retaining element. The at least one leg has a latching section for retaining the retaining element on a support. The fastener further comprises a channel for receiving a section of the retaining element, wherein the fastener has at least one contact region for the retaining element that is at least partially positioned within the channel. The contact region is connected to the engaging section by a connecting section. In addition, the contact region has a section with an angle more than 0° and less than 90° to the longitudinal axis of the channel. Since the fastener has a further contact region for a section of a retaining element, the number of contact regions and/or engaging sections of the fastener can be increased with regard to the retaining element. The force for securing the retaining element to the support or securing the fastener to the retaining element can be increased. Different shapes and designs of the contact region and/or a possible adaptation of the section of the retaining element which comes into contact with the contact region can be flexibly created. In so doing, one can ensure that removal can be accomplished, in particular during maintenance, by overcoming the maximum force between the retaining element and the fastener and separating the fastener from the retaining element.

In the context of the description of the present invention, retaining on the one hand and securing are mentioned. "Retaining" is understood to mean that the retaining element is connected to the support via the fastener or fastened thereto in such a way that the retaining element does not detach from the support in a normal operating state and can rest substantially close against the support. In a defined operating state, for example the triggering of an airbag device that can have the retaining element in the form of a retainer, or when the retaining element is pulled away from the support with a force above a predetermined force level, the retaining element can release from the support and then can only be held on the support by the fastener in a second stage. In this case, the retaining element is spaced from the support. Detaching the fastener in the form of a movement of the retaining element toward the support in the longitudinal axial direction of the fastener is thus an intended operating state of the fastener according to the invention. By contrast, "securing" describes a firm connection between two parts, in particular between the fastener and the retaining element which is not to be released in any operating state of the fastener. However, this does not rule out that such a connection can also be released. This can be provided, for example, when the retaining element is to be completely separated from the support, for example in a case of maintenance. The type of connection of the fastener to the support and the type of connection of the fastener to the retaining element should, however, be selected such that it still remains while the "retaining" function is released between the retaining element and the support. This is referred to as a two-stage fastening via the fastener.

The term "retaining" of the retaining element on a support thus comprises the suitability of the fastener for connecting the retaining element engaged with the fastener to the support, and in particular the suitability of the fastener for retaining the connecting element on the support. The term "retaining" comprises preventing movement of the retaining element relative to the support on which the retaining element is to be retained, in the region of the fastener, in particular a movement along a longitudinal axis of the fastener in both directions. In the case of the fastener according to the invention, the suitability for "retaining the retaining element" on the support results from the latching section, wherein a latching section for resting against an opening of the support is provided on one leg, and the latching section serves to retain the retaining element on the support, or is designed therefor. Furthermore, the fastener has at least one engaging section that is engaged with the retaining element; the engaging section can in particular engage in a recess in the retaining element or rest against a contact surface of the retaining element that does not extend parallelly to the longitudinal axis of the fastener. The recess may extend in a direction transverse to the longitudinal axis of the retaining element and/or of the fastener.

If the force necessary to move a region, interacting with the contact region, of the section of the retaining element that is located in the channel past the contact region in the direction of the longitudinal axis, and/or to move the part of the retaining element that interacts with the engaging section past the contact region is greater than the force necessary to move the latching region past the support in the direction of the longitudinal axis, the latching section of the fastener on the support is released in a first stage of releasing the fastener, for example with a force of approximately 200 N, wherein the engagement of the engaging section on the fastener is maintained. In this first stage, the retaining element can detach from the support and in particular move in the direction of the longitudinal axis of the fastener. In the first stage, the retaining element remains secured to the fastener. In a second stage, for example after applying a force of approximately 270 N, the engaging section of the fastener can be disengaged from the retaining element, wherein the section of the retaining element in the channel also moves in the direction of the longitudinal axis of the fastener.

The term "retaining element" within the meaning of the invention comprises a component or a part to be held on a support, for example a retainer of an airbag.

It can additionally or alternatively be provided that the connection between the fastener and the retaining element is designed such that a release of the connection between the fastener and retaining element in the direction of the longitudinal axis of the fastener is impossible; instead, the fastener has to be moved in a direction transverse to the longitudinal axis. The fastener can secure the retaining element in such a way that, in the direction of the longitudinal axis of the fastener, a form fit prevents the fastener from detaching from the retaining element. Releasing can then take place by a movement in another direction of movement, in particular transverse to the direction of the longitudinal axis of the fastener.

The term "support" within the meaning of the invention comprises, for example, a panel or a plate for fastening a vehicle body, in particular a body panel. The "support" may also be part of the vehicle body or of the body panel.

The term "retaining clip-like" within the meaning of the invention describes an embodiment of a fastener, in particular of a metal, for example steel, in specific embodiments a spring steel, with a body having at least one leg, wherein the term "retaining clip-like" includes in particular a two-leg body. The fastener can in particular be configured symmetrically with respect to its longitudinal axis. The symmetry can in particular be an axial symmetry with respect to the longitudinal axis of the fastener. Each of the legs or the further sections extending to the legs can be subdivided into different sections, which in turn can be subdivided into different sections. The different sections can be provided with different cross sections or cross-sectional geometries.

According to a rough classification, the fastener may be subdivided into a foot section, into a neck section and a head section, wherein the sections can transition smoothly into one another so that there does not have to be a, and generally is no, clear separation along a line. The foot section is essentially provided for inserting the fastener into an opening of the support which can in particular be configured as an elongated hole. The neck section and head section of the fastener may be located above the support, wherein in particular the head section substantially serves to engage with the retaining element. The neck section essentially has sections of the fastener that substantially extend in the direction of the longitudinal axis of the fastener.

The term "engaging section" within the meaning of the invention comprises a section of the fastener that serves to engage in the retaining element. The fastener is fastened to the retaining element via this engaging section, and the retaining element is secured to the support by the fastener. The retaining element can in particular have a recess which extends transversely to the longitudinal axis of the fastener and/or the retaining element and in which the engaging section can engage.

The term "latching section" comprises a section of the fastener, with which the retaining element can be retained on the support. The fastener may be held with the latching section in an opening of the support in that the latching section comes into contact with a wall of the opening, or with an edge of the support forming the transition between a wall of the opening and a further surface. In this case, it can be provided that this contact is force fit, and in particular is brought about by a spring force pressing the latching section in its installed location in the direction away from the longitudinal axis. With the latching section, the fastener can also engage in a form fit through an installation opening formed in the carrier. It is also possible to provide latching sections which are arranged at a distance from each other in the longitudinal direction of the fastener and which can be assigned to the two stages of "retaining" or "securing" the retaining element. For example, the latching section adjacent to the head section of the fastener can be designed as a latching ramp to which can be connected a back ramp for adjusting the rigidity of the latching ramp, or for adjusting the force with which the fastener can be released from the support. Adjacent to the base of the fastener, another latching section designed as a catch section can be provided which can have at least one detent lug, wherein the fastener on the support can be unreleasably connected thereto via the latching section designed as a catch section.

The term "channel" which is formed by the fastener refers to an at least partially circumferentially arranged, longitudinally extending, channel-like region into which a section of the retaining element can be moved. In particular, the channel can be formed between two mutually facing sections of the legs.

The term "connecting section" includes a section of the fastener provided between two sections in order to connect them. The connection can take place indirectly or directly. A connecting section is typically designed to be linear or flat, i.e., a connecting section can lie at least partially in one plane. Alternatively or additionally, the connecting section may also have curved sections in the end region in order to connect to other sections. A connecting section provided between the engaging section and the deflecting section may have an angle of between about 30% and about 60%, alternatively an angle of between about 35% and about 55%, with respect to the longitudinal axis of the fastener.

The term "contact region" includes a region of the body of the fastener that is designed for contact with the retaining element. The contact region may have at least one section of the fastener that is at least partially substantially straight, in particular in one plane. In this case, the term "straight" also includes microscopic and macroscopic modulations which are immaterial for the function of the contact region resting against the fastener at the section of the retaining element.

If the contact region is connected to the engaging section via a connecting section, this includes in particular that the contact region abuts the engaging section. A movement of the contact region can lead to a movement of at least one section of the engaging section or to an impingement on the engaging section. For example, movement of the contact region in the direction away from the longitudinal axis due to the connection by the connecting section may cause the engaging section to pivot toward the longitudinal axis. This can be achieved in that the engaging section is connected both via the connecting section to the contact region and to a section of the leg which is not connected to the contact region or the connecting section. This may cause the connection of the engaging section to form a pivot axis with the further section of the leg, about which axis the contact region can be pivoted away from the longitudinal axis, and the engaging section in turn can be pivoted toward the longitudinal axis. In such an arrangement, the force that is necessary to longitudinally move a part interacting with the contact region, for example a latching element, of the section of the retaining element located in the channel relatively to the contact region, and/or that is necessary in order to move the engaging section past the part of the retaining element with which it interacts, is determined in particular by the position of the engaging section relative to the contact region, by the angular position of the engaging section relative to the longitudinal axis, by the angular position of the contact region relative to the longitudinal axis, by the choice of material, shape and orientation of the connecting section, and by the type of the connection of the engaging section with the further region of the leg. These all influence the force that is necessary to pivot the contact region away from the longitudinal axis and the engaging section toward the longitudinal axis.

The section which was mentioned with regard to the contact region and which extends at an angle greater than 0° and less than 90° to the longitudinal axis of the channel or to the longitudinal axis of the fastener is selected such that securing is functionally possible, and this engagement can also be released upon applying a predetermined tensile force.

The term "fastener" comprises in particular a device that can be clipped onto or inserted into the retaining element and/or the support in order to create a releasable connection between the two with the fastener.

The term "facing" within the meaning of the invention with regard to two surfaces, or sections of two surfaces, includes that the surface normals of the surfaces or sections of the surfaces under consideration have an angle of <45 degrees to one another. In particular, the surface normals of the considered surfaces can enclose an angle with each other of significantly less than 45°, i.e., substantially 10 to 0°.

Within the meaning of the invention, the term "in the direction" with respect to a movement includes a movement having a directional component that is parallel to the direction; the term "in the direction" is not necessarily understood to mean only a translational movement in this one direction.

If the term "a" and corresponding grammatical modifications to the genus of the indicative element following the term is used in the description and claims, this term encompasses the singular and the plural of that indicative element. The term "a" and corresponding grammatical modifications to the indicative element following the term generally does not exclude providing additional elements. A numerical word (2, 3, 4, etc.) includes the possibility that there may be more elements than those denoted by the numerical word used.

The term "symmetry" or "symmetrical" within the meaning of the invention may include a symmetry with regard to one or more axes, or a symmetry with regard to a point, or with regard to a plane, wherein minor deviations from the purely geometrical symmetry which do not significantly impair the function are included.

Numbers and numerical information within the meaning of the invention which are in particular preceded by the term "approximately" can also include, in addition to the specifically stated number, an up to 10% deviation or in particular an angular range of +/−10° from the specifically stated numerical value.

The term "have" and the term "comprise" also include the term "consist of" in addition to the pure actual meaning of these terms.

In certain embodiments, the engaging section encloses an angle of less than or equal to 90° with the longitudinal axis of the fastener, which results in easier engagement of the engaging section in a corresponding element of the retaining element. The angle may preferably be between approximately 65° and 85°. If there is a spring force between two legs on each of which there is an engaging section, there is also a connection in the form of a force fit via the preload existing between the legs in addition to the form fit.

In certain embodiments, the contact region has a deflecting section or it adjoins the deflection section, wherein the deflecting section is arranged in the region of the channel. The alternative description that the deflecting section can be part of or adjoins the contact region has been chosen, since the deflecting section must be part of the contact region only partially or not at all. In the assembled state, it can be provided that the deflecting section does or does not contact the section of the retaining element. With the deflecting section, a section or a region of the fastener may be provided that not only protrudes into the channel but can also be arranged in the direction away from the channel. For example, a further engaging section described below for the retaining element can adjoin such a region or section, or be formed on the section. With the deflecting section, it is also possible to achieve an enlargement of the contact region in that not only a section is provided which can contact the section of the retaining element by protruding into the channel, but also in a region directed away from the channel.

The term "deflecting section" includes a section in which the material undergoes an at least partial reversal of direction. A deflection of more than 60°, alternatively more than 70°, alternatively more than 80°, alternatively substantially within a range of 90°, is usually achieved. The deflecting section comprises a section which is arranged in the region of the channel and from which material extends in two directions. The deflecting section can comprise a region which is considered a symmetrical section, i.e. a region in relation to which sections, for example, in particular connecting sections, can be arranged symmetrically. In particular with regard to a cross-sectional view, the deflecting section can have a region relative to which the material deflected in the deflecting section can be designed to be symmetrical, i.e., in particular point-symmetrical. The deflecting section can in particular be a section that extends furthest from the center axis into the channel, or is arranged therein.

In certain embodiments, the contact region can form, with the connecting section and the deflecting section in the direction of the longitudinal axis of the fastener, part of a V-shaped, U-shaped, diamond-shaped, partially circular or partially elliptical section. Such an embodiment is typical since insertion of the section of the retaining element into the channel can be facilitated due to this geometry, and the surface for the contact region for forming a securing force can be increased. Furthermore, with the selected geometry, a rigidity in this region of the fastener can also be adjusted. A symmetrical design of the connecting section, deflecting section and a further section which adjoins the deflecting section, in particular a further connecting section which is directed away from the channel from the deflecting section, may be desired. With such symmetry, it does not matter whether the engaging section can adjoin the connecting section in the further progression, and whether the further engaging section can adjoin the section following the deflecting section, the further connecting section. There is no need for symmetry between the engaging section adjoining the connecting section and the sections adjoining the further connecting section, in particular in the form of the engaging section and the further engaging section. The symmetry can be restricted to the connecting section, the deflecting section and the connecting section adjoining the deflecting section.

In various embodiments, an outwardly extending further engaging section for the retaining element adjoins the contact region in the further progression, in particular a region that extends away from the channel. This engaging section can also be understood as a catch element. The further engaging section for the retaining element is designed in such a way that the further engaging section is designed for a form fit with the retaining element in the longitudinal direction of the fastener. This can prevent a movement of the retaining element relative to the fastener in the direction of the longitudinal axis of the fastener from being executable beyond a relative position in which the catch element abuts a surface of the retaining element. For example, the further engaging section can be brought into contact with an inner wall of the retaining element. The further engaging section can therefore substantially prevent the fastener from detaching from the retaining element with respect to a force applied in the longitudinal direction of the fastener. Detachment of the fastener from the retaining element can, however, be achieved in that the further engaging section (the catch element) can be moved transversely to the longitudinal axis of the fastener, and the fastener can be guided out of the retaining element through a transverse opening in the retaining element. In specific embodiments, the further engaging section has at least one section that extends substantially transversely to the longitudinal axis of the fastener. Between the further engaging section and the longitudinal axis of the fastener, there may be an angle of more than 45°, alternatively about 90°. The design of the further engaging section transverse to the longitudinal axis of the fastener allows the surface that comes into contact with a wall of the retaining element to be enlarged, and the stability or securing property to thus be increased.

The term "further engaging section" includes a further section with the engaging section via two connecting sections and one deflecting section. A symmetry of the connecting sections with respect to the deflecting section may be used to extend the further engaging sections substantially in the same direction as the engaging sections so that an applied force leads to a separation, in particular a spreading, of the further engaging sections in order to perform the securing function. The engaging sections may also extend outwardly like the engaging sections.

In various embodiments, the further engaging section is connected to the contact region via a further connecting section extending through a window in a leg of the fastener, which allows a compact design of the fastener to be achieved. The base area of the body of the fastener transverse to the longitudinal axis of the fastener is small despite the increased functionality achieved, wherein the formation of a window in a leg of the fastener has no effect that impairs the stability of the fastener.

In certain embodiments, the window is formed in a section of a leg which has an angle not equal to 0° to the longitudinal axis of the fastener, whereby an enlargement of the channel on the head section can be easily produced, wherein the section is oriented such that the distance of the leg from the longitudinal axis increases in the direction from the base of the retaining clip. In other words, the distance of the section increases in the direction from the neck section to the head section. The design of the section enables the above-described symmetrical design between the connecting section, deflecting section and the section following the deflecting section. In a specific embodiment, the angle can be within the range of about 5° to about 25°, alternatively within the range of about 10° to about 20°.

The resting surfaces or contact surfaces for a latching element of the retaining element can form, in a cross-sectional view with other sections, a complex structure which in each case has a contact surface in several directions. For example, a diamond-shaped, V-shaped, U-shaped, partially circular or partially elliptical design is possible in the cross-sectional direction. Such a structure allows the contact surfaces to be arranged in several opposing directions.

In certain embodiments, the spatial extent of the engaging section from a central axis of the fastener is more than the spatial extent of the further engaging section from the central axis of the fastener. This allows a tapering of the fastener in the direction from the head section to the foot section of the fastener to be achieved, which nonetheless does not lead to an impairment of the functionality and simplifies the handling of the fastener.

The fastener may have a recess, or bead, or detent lug that extends into the channel, whereby stability of the fastener, in particular in the neck section, can be achieved. In this case, the detent lug can be provided to engage in the section of the retaining element located in the channel. The recess, or bead, or detent lug may in particular be arranged in the end region of the neck section toward the foot section. The recess, or bead, or detent lug is formed groove-like in the direction of the longitudinal axis of the fastener, wherein in the direction of the head section, the groove can be designed to be punctured or open. The end region of the recess, or the bead, or the detent lug which faces the head section can serve as a stop for the section of the retaining element inserted into the channel, in particular if a recess for interaction with the recess, or bead, or detent lug is provided in the section inserted into the channel.

The invention also provides a system comprising an above-described fastener and a retaining element. In this case, the distance between the engaging section and the contact region in the longitudinal direction of the fastener is adapted to a distance of the retaining element between a contact surface of the retaining element against which the engaging section can rest, and a latching element which is provided on a section of the retaining element to be accommodated by the channel and against which the contact region rests. Such an adaptation has the result that a retaining element which is arranged on the support and fastened via the fastener can be arranged close to the support. A distance between the support and the end of the retaining element facing the support can be minimized and/or adjusted.

In certain embodiments, the system can be adapted in such a way that the section of the retaining element present in the channel is adapted to the geometric design of the fastener such that a contact of the section both at the contact region of the fastener and a region of a leg facing the contact region is enabled; in particular, the region of the leg can be provided in a section in which the window for the passage of the further connecting section is formed. With a section of the retaining element designed in this manner, contact in basically two opposite directions can be achieved. For example, the section of the retaining element with contact can cause the leg to spread, and with contact at the contact region can cause an increase in the force in the opposite direction to secure the fastener to the retaining element. The design of the section of the retaining element can thus be designed as a complementary effect on the fastener. In particular, the region of the leg facing the contact region can be the section of the fastener in which the window is formed for the further connecting section and/or in the indirect or direct progression of which the engaging section adjoins.

In certain embodiments, the section of the retaining element has a region with which the leg of the fastener is stabilized in a position relative to the longitudinal axis of the fastener. The section of the retaining element is thus designed in a region at a distance from the contact of the fastener in the region of the contact region of the fastener in such a way that the fastener can be preloaded or pressed apart in a position corresponding to a spread position of the leg or legs. For this purpose, the section of the retaining element can have a bar that can extend in particular in the neck section of the fastener.

In certain embodiments, the retaining element can have lugs which are designed to rest on the support in order to minimize the contact region between the retaining element and the support and/or to enable stable contact.

In certain embodiments, a latching section is provided that is formed by a latching ramp which extends at an angle to the longitudinal axis and which, in comparison with the engaging section, is located on the other side of the contact region and has a surface which faces the surface of the engaging section coming into contact with the contact surface of the retaining element.

In certain embodiments, a further latching section is provided in the form of a catch section that has a surface which faces the surface of the engaging section coming into contact with the contact surface of the retaining element, wherein the catch section is arranged farther along the longitudinal axis of the engaging section in comparison with the latching section.

The fastener according to the invention or the system according to the invention is used in particular for fastening retainers for airbags.

BRIEF DESCRIPTION OF THE DRAWINGS

The invention is described in greater detail below with reference to the accompanying figure, in which.

DETAILED DESCRIPTION

Figure 1:
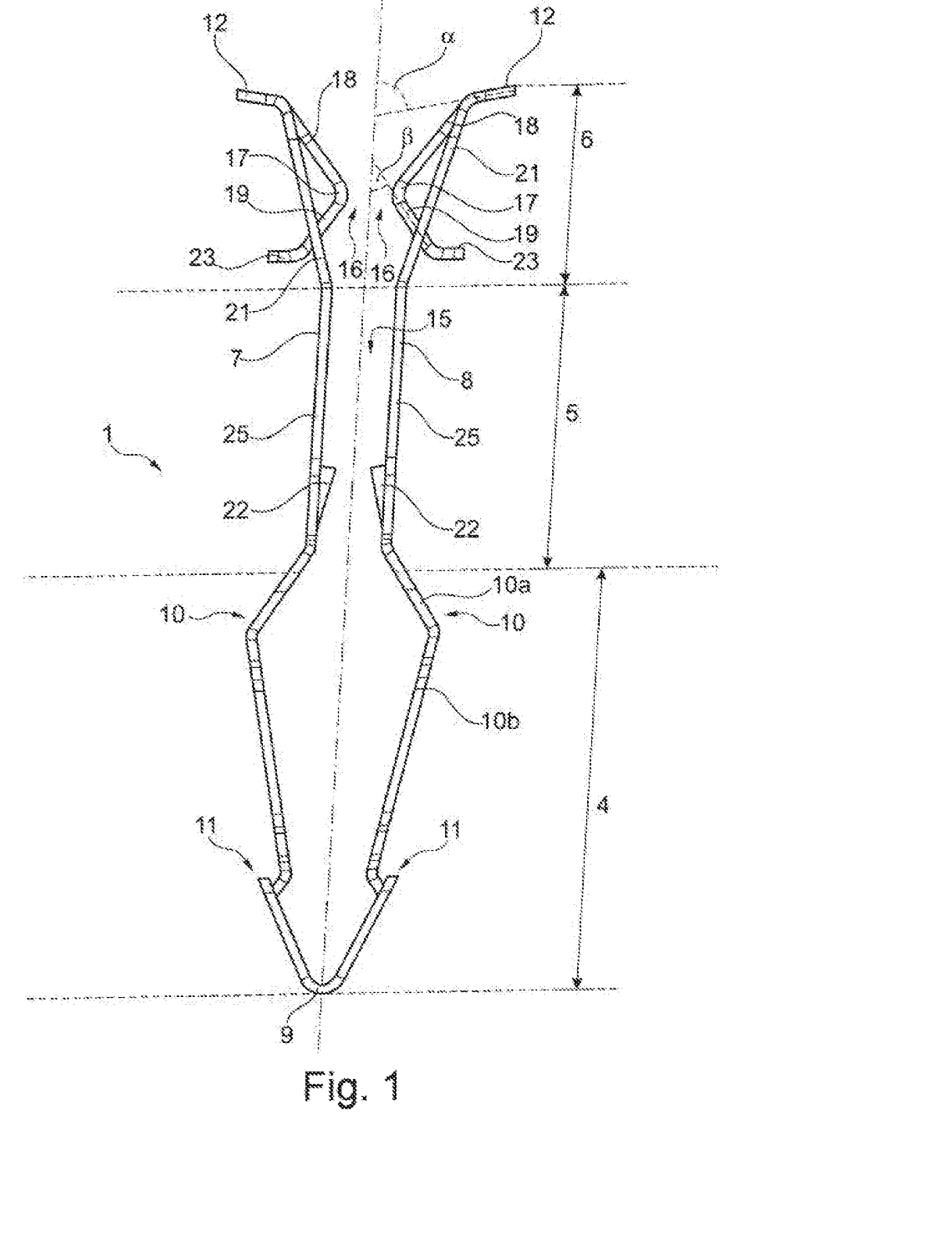
FIG. 1 shows a side view of one embodiment of a fastener.
Figure 2:
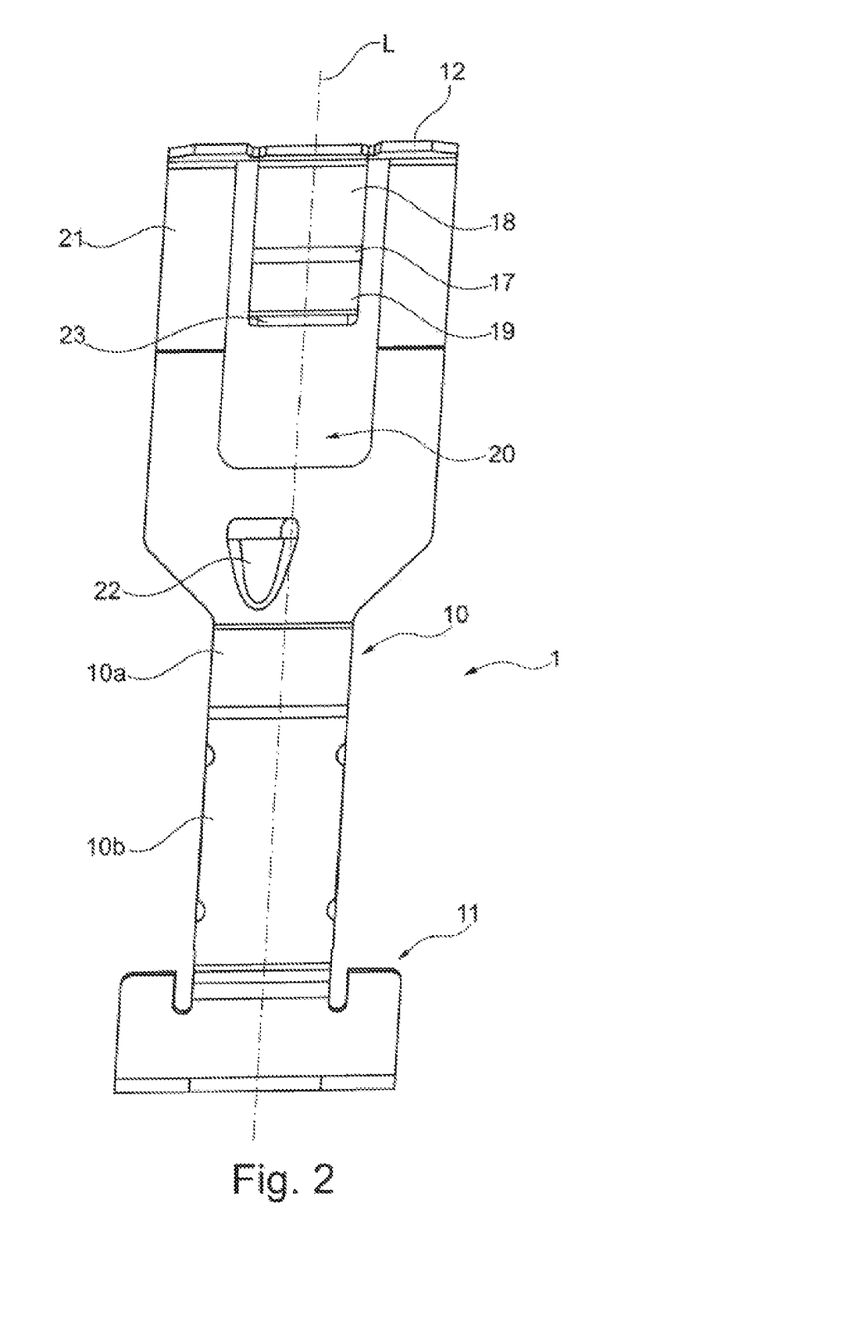
FIG. 2 shows another side view of the fastener according to FIG. 1 in a view rotated by 90°.
Figure 3:
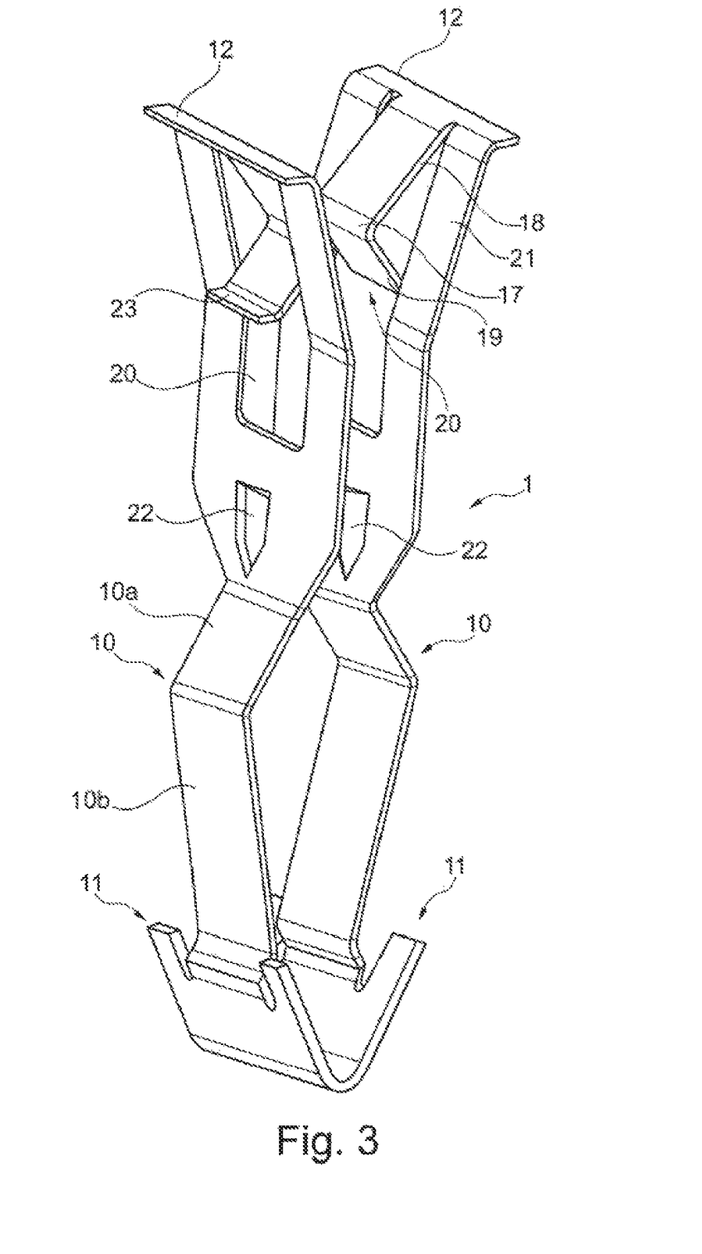
FIG. 3 shows an isometric view of the fastener according to FIGS. 1 and 2.

Referring to FIGS. 1-8, wherein like numerals indicate corresponding parts throughout the several views, a fastener is illustrated and generally designated 1. In particular, in accordance with certain embodiments, FIG. 1 shows a side view of a fastener 1 for securing a retaining element 2 on a support 3 (see FIGS. 4 to 6). The fastener 1 comprises a foot section 4, a neck section 5 and a head section 6, wherein the clear rectilinear separation shown in FIG. 1 is indicated only schematically. The sections smoothly transition into each other.

The fastener 1 is designed like a retaining clip and has two legs 7, 8 that are connected to each other by a base 9.

Figure 4:
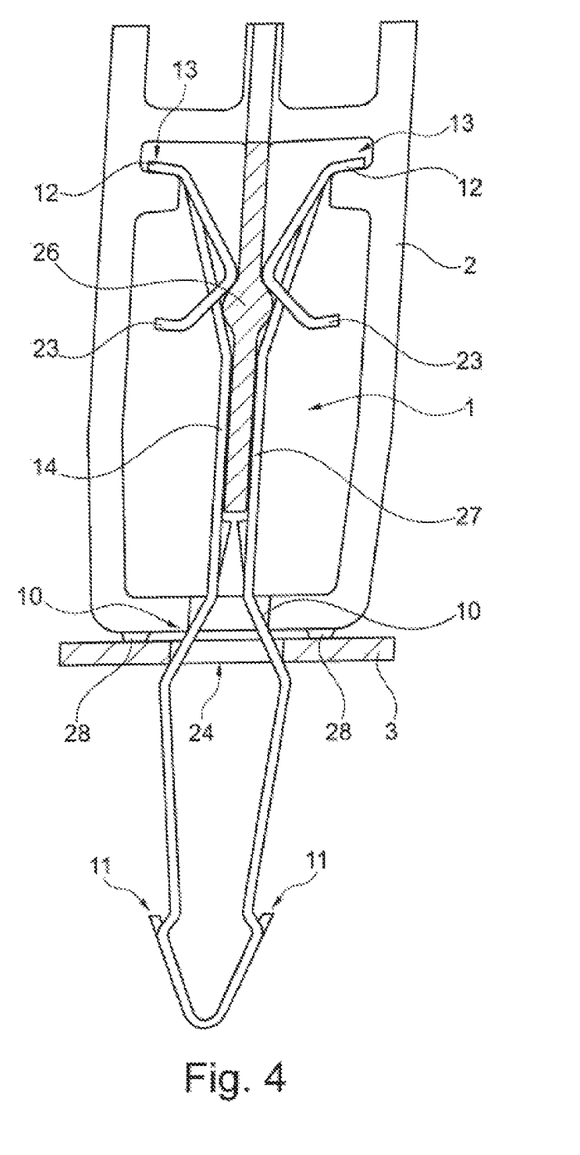
FIG. 4 shows a partial sectional view of a fastener according to FIGS. 1 to 3 with a retaining element and a support in a first operating state.

In the region of the foot section 4, a latching section 10 and a catch section 11 are provided for each of the two legs 7, 8. The latching section 10 and the catch section 11 are arranged at a distance from each other with respect to the longitudinal axis L of the fastener 1. The latching section 10 has a latching ramp 10*a* and a back ramp 10*b* with which the fastener 1 can be locked in an opening 24 designed as an elongated hole. The latching section 10 is provided for retaining the retaining element 2 on the support 3, as shown in FIG. 4 for a first operating state. In the first operating state, the fastener 1 is locked on the support 3 by the latching ramp 10*a* of the legs 7, 8.

In order to fasten the retaining element 2, the fastener 1 has for each of the legs 7, 8 an engaging section 12 which extends outwardly from the longitudinal axis L of the fastener 1 at an angle α of about 85° to the longitudinal axis L and is designed to engage with the retaining element 2. For this purpose, the retaining element 2 has recesses 13 in which the engaging section 12 of the fastener 1 can engage by contacting a contact surface forming part of the recess in the first operating state, as can be seen in FIG. 4.

The retaining element 2 has a section 14 which is adapted to a channel 15 in the fastener 1. The channel 15 in the fastener 1 is at least partially bordered by the legs 7, 8. As part of the fastener 1, a contact region 16 is always provided in the channel 15. The contact region 16 extends at an angle β of about 45° to the longitudinal axis (L) of the fastener. The contact region 16 can come into contact with a region of the section 14 of the retaining element 2 in order to secure the retaining element 2. The contact region 16 of the fastener 1 acts against a movement of the retaining element 2 in the direction of the longitudinal axis L of the fastener 1 away from the support 3.

A deflecting section 17 which projects into the channel 15 is provided in the contact region 16 of the fastener 1. The deflecting section 17 is connected to the engaging section 12 via a connecting section 18. An outwardly extending further engaging section 23 for the retaining element 2 adjoins the contact region 16. A further connecting section 19, which is part of the contact region 16 for the section 14 of the retaining element 2, adjoins the deflecting section 17 in the direction of the foot section 4 of the fastener 1. The further connecting section 19 is bent back onto the connecting section 18. The connecting section 19 extends through a connecting window 20 in the fastener 1 formed in the legs 7, 8. The further engaging section 23 is connected to the contact region 16 via the further connecting section 19 extending through the window 20. The connecting section 18, the deflecting section 17 and the further connecting section 19 form part of a diamond-shaped structure, as can be seen in the side view in FIG. 1.

The window 20 is formed in a section 21 of the legs 7, 8 which has an angle not equal to 0° relative to the longitudinal axis L of the fastener 1.

In the neck section 5 of the fastener 1 which has substantially rectilinear sections 25 that enclose a small angle close to 0° with the longitudinal axis L of the fastener 1, a groove-shaped recess 22 that protrudes into the channel 15 is respectively formed for reinforcing the sections 25 and as a stop for the section 14 of the retaining element 2 in the direction of the support 3.

FIG. 4 shows that the section 14 of the retaining element 2 is adapted to the fastener 1. The distance between the engaging section 12 and the contact region 16 in the longitudinal direction of the fastener 1 is adapted to a distance of the retaining element 2 between the recess 13 positioned at the proximal end of the retaining element 2 and a latching element 26 for resting against the contact region 16, positioned substantially along the centerline of the retaining element 2. The latching element 26 of the retaining element 2 is adapted to the geometric shape of the fastener 1 in that the region provided for resting against the contact region 16 substantially replicates this shape. A surface formed on the latching element and facing the support 3 substantially replicates the shape of the section 21 which comes into contact with the corresponding surface of the latching element.

A bar 27 which presses the two legs 7, 8 apart in the neck section 5 of the fastener 1 adjoins the latching element 26 of the retaining element 2 in the section 14 of the retaining element 2.

Figure 5:
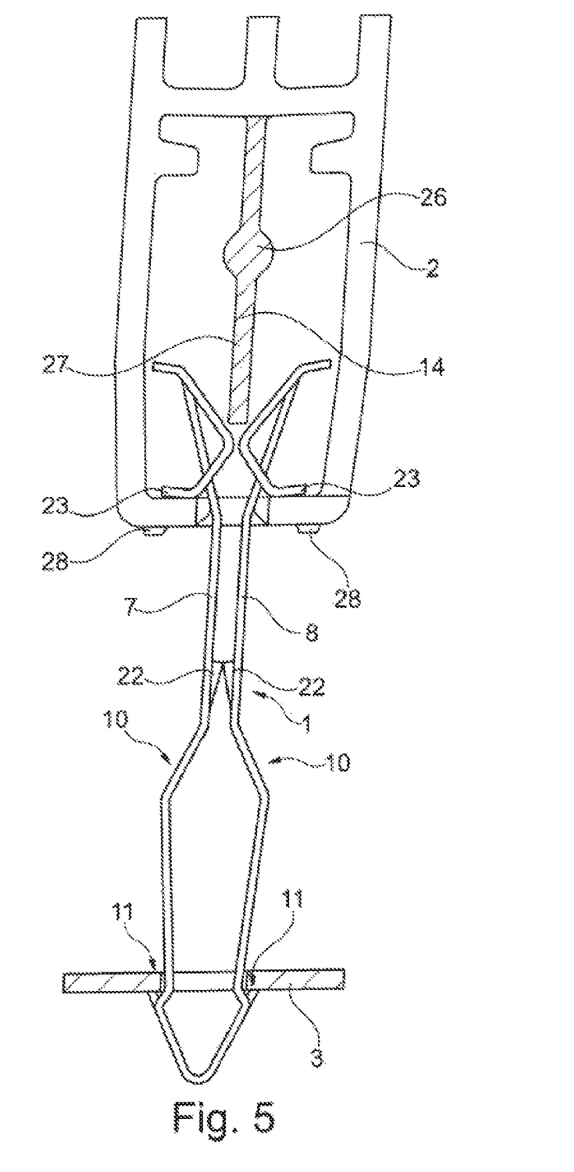
FIG. 5 shows the fastener, the support and the retaining element according to FIG. 4 in a further operating state.

FIG. 5 shows the other operating state which, for example, exists after an airbag is triggered if the retaining element 2 is designed as a retainer of an airbag system. The retaining element 2 is secured to the support 3, wherein the retaining element 2 has moved with respect to the support 3. The fastener 1 has moved relatively to the support 3, and the retaining element 2 has moved relatively to the fastener 1. In particular, the section 14 of the retaining element 2 has disengaged from the contact region 16 of the fastener 1. The retaining element 2 is secured in relation to the support 3 in the longitudinal axial direction of the fastener 1, since the fastener 1 is in a form fit in this direction. In view of the latching section 11, the fastener 1 is held captive in the opening 24 of the support 3.

Lugs 28 which are designed for resting against the support 3 on an outer wall of the retaining element 2 are exposed.

Figure 6:
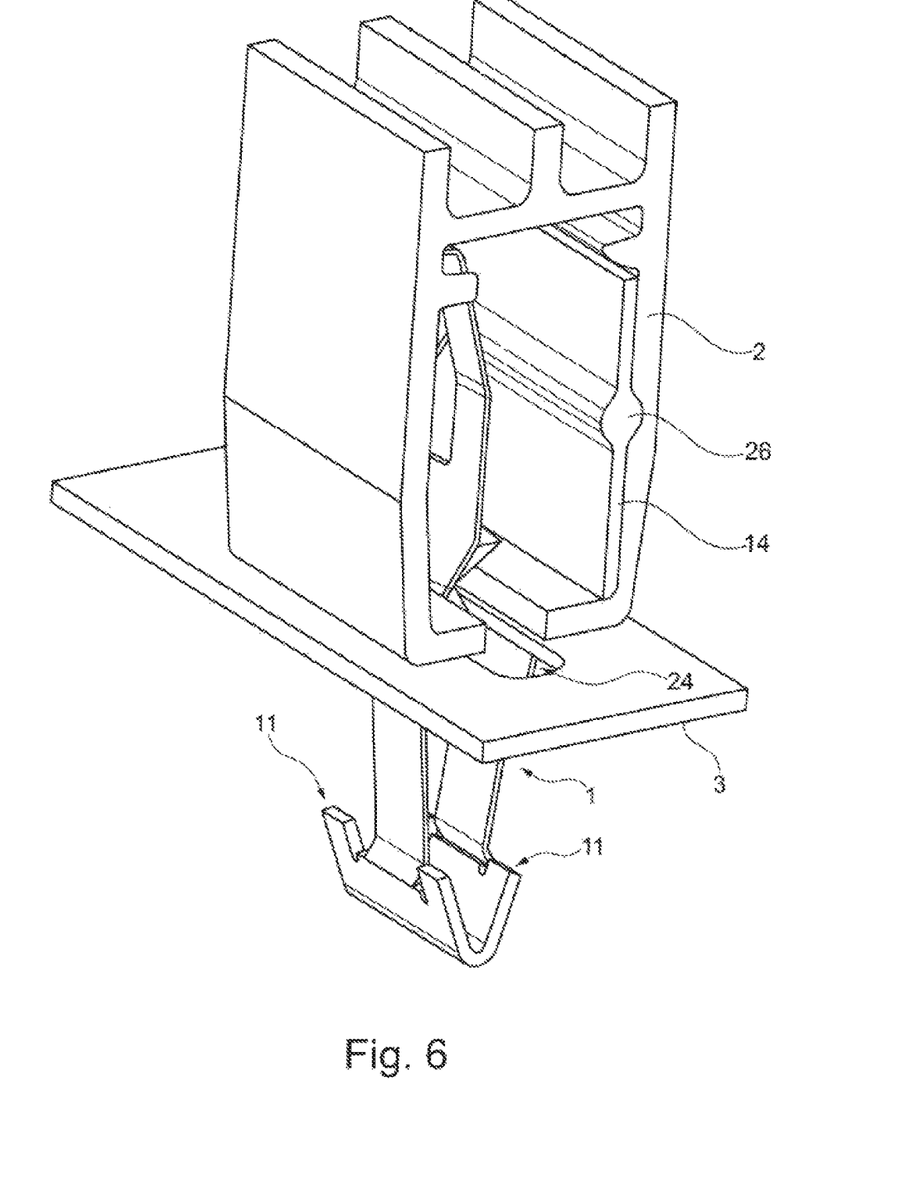
FIG. 6 shows the fastener, the support and the retaining element according to FIG. 4 in an isometric representation.

FIG. 6 shows the first operating state according to FIG. 4 in an isometric view.

Figure 7:
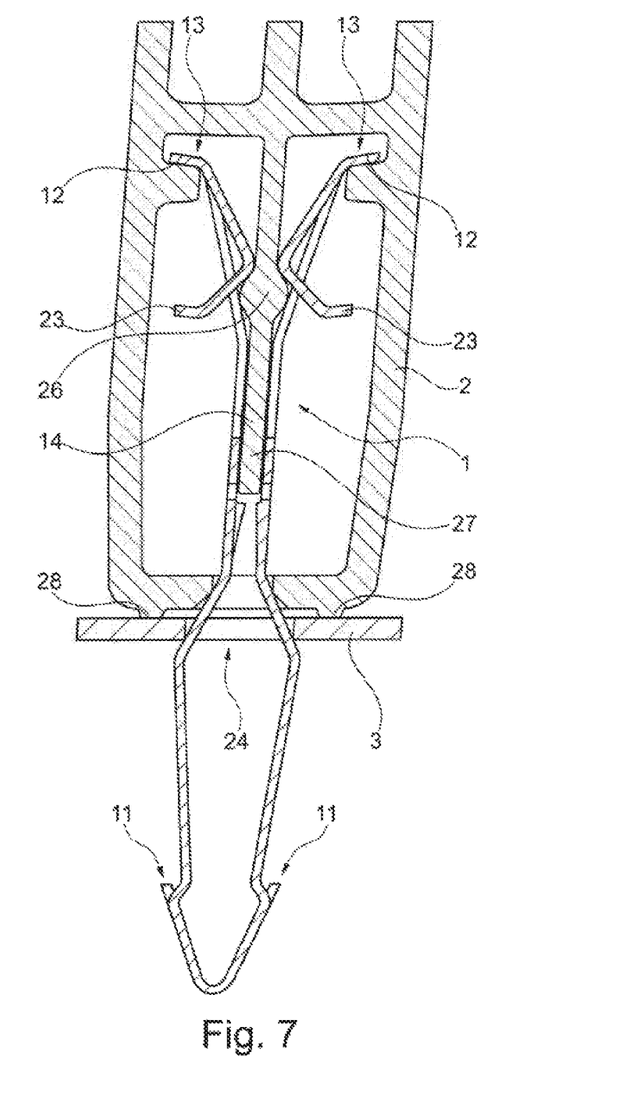
FIG. 7 shows the fastener, the support and the retaining element according to another embodiment in a first operating state.

FIG. 7 shows one fastener 1, one support 3 and one retaining element 2 according to another embodiment in a first operating state. The difference between the retaining element 2 of the embodiment according to FIGS. 1 to 6 is essentially that the latching element 26 is designed with a round cross-section and essentially approximates an elliptical or spherical shape. The retaining element 2 according to FIGS. 7 and 8 can be used or combined with the fastener 1 according to FIGS. 1 to 6.

Figure 8:
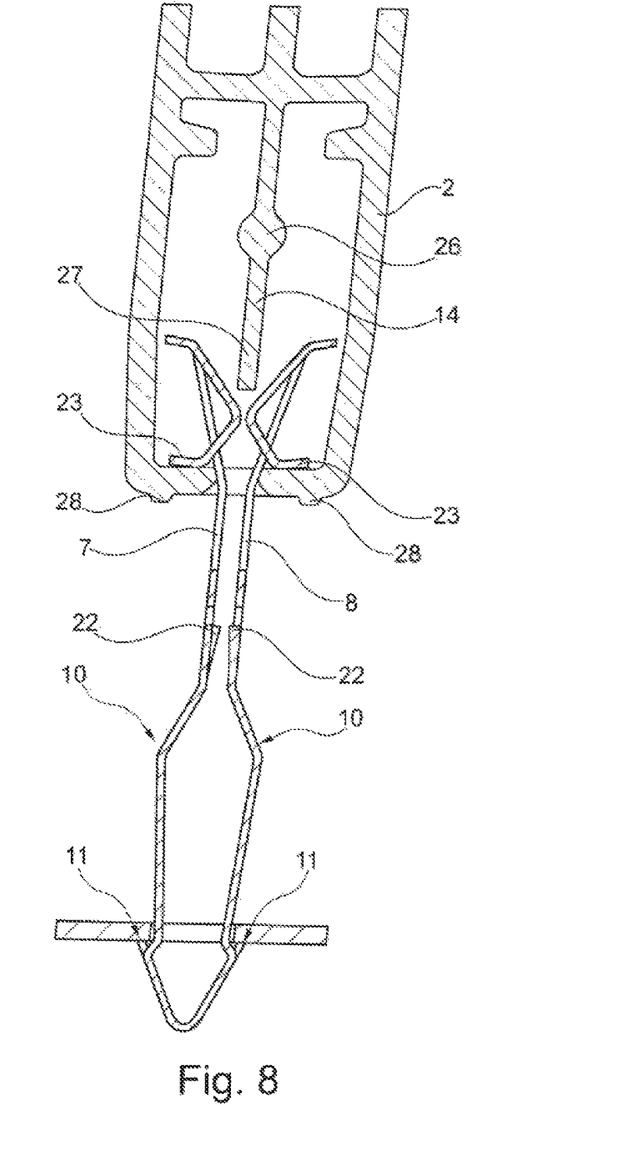
FIG. 8 shows the fastener, the support and the retaining element according to FIG. 7 in a further operating state.

The difference between the fastener 1 according to FIGS. 7 and 8 and the fastener 1 according to FIGS. 1 to 6 is essentially that the recess 22 is formed on the leg 8. While the recess 22 on the leg 7 projects far into the channel 15, the recess 22 on the leg 8 projects slightly into the channel 15.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A fastener for securing a retaining element on a support, wherein the fastener is formed like a retaining clip and has at least one leg and at least one engaging section, wherein the engaging section extends outwardly from the longitudinal axis of the fastener and is capable of engaging the retaining element, wherein the leg has at least one latching section for retaining the retaining element on the support, wherein the fastener has a channel for receiving a section of the retaining element, wherein the fastener has at least one contact region for contact with the retaining element that is positioned at least partially within the channel, wherein the contact region is connected to the engaging section via a connecting section, wherein the contact region extends at an angle greater than 0° and less than 90° to the longitudinal axis of the channel, wherein the fastener has at least one outwardly extending further engaging section that adjoins the contact region, and wherein the further engaging section is connected to the contact region via a further connecting section extending through a window defined by the leg of the fastener.

2. The fastener according to claim 1, wherein the engaging section encloses an angle of less than or equal to 90° with the longitudinal axis of the fastener.

3. The fastener according to claim 1, wherein the contact region has a deflecting section, or a deflecting section adjoins the contact region, wherein the deflecting section is arranged in the region of the channel.

4. The fastener according to claim 3, wherein the contact region forms, with the connecting section and the deflecting section in the direction of the longitudinal axis of the fastener, a part of a V-shaped, U-shaped, diamond-shaped, partially circular or partially elliptical section.

5. The fastener according to claim 1, wherein the window is defined in a section of a leg which has an angle not equal to 0° to the longitudinal axis of the fastener.

6. The fastener according to claim 1, wherein the distance of the engaging section from a central axis of the fastener is greater than the distance of the further engaging section from the central axis of the fastener.

7. The fastener according to claim 1, wherein the fastener has a groove-shaped recess, or bead, or detent lug extending into the channel.

8. A system comprising a fastener according to claim 1 and a retaining element, wherein a distance between the engaging section and the contact region in the longitudinal direction of the fastener is adapted to a distance between a contact surface of the retaining element against which the engaging section can rest, and a latching element which is provided on a section of the retaining element to be received by the channel and against which the contact region rests.

9. The system according to claim 8, wherein the section of the retaining element located in the channel is adapted to the fastener in such a way that both a contact of the section on the contact region and on a region of the leg facing the contact region in the section of the fastener is made possible.

10. The system according to claim 8, wherein the latching section is formed by a latching ramp which extends at an angle to the longitudinal axis, and is located on the other side of the contact region in comparison with the engaging section and has a surface facing the surface of the engaging section coming into contact with the contact surface of the retaining element.

11. The system according to claim 10, further comprising a catch section having a surface which faces the surface of the engaging section coming into contact with the contact surface of the retaining element, wherein the catch section is arranged farther along the longitudinal axis from the engaging section in comparison to the latching section.

* * * * *